United States Patent
Islam et al.

(10) Patent No.: US 11,764,851 B2
(45) Date of Patent: Sep. 19, 2023

(54) EVALUATION PERIOD FOR BEAM FAILURE DETECTION AND CANDIDATE BEAM DETECTION IN MULTI-BEAM NR-U

(71) Applicant: QUALCOMM Incorporated, San Diego, CA (US)

(72) Inventors: Muhammad Nazmul Islam, Littleton, MA (US); Awlok Singh Josan, San Francisco, CA (US); Arash Mirbagheri, San Diego, CA (US); Valentin Alexandru Gheorghiu, Yokohama (JP)

(73) Assignee: QUALCOMM Incorporated, San Diego, CA (US)

( * ) Notice: Subject to any disclaimer, the term of this patent is extended or adjusted under 35 U.S.C. 154(b) by 421 days.

(21) Appl. No.: 16/993,119

(22) Filed: Aug. 13, 2020

(65) Prior Publication Data
US 2021/0050902 A1  Feb. 18, 2021

Related U.S. Application Data

(60) Provisional application No. 62/888,112, filed on Aug. 16, 2019.

(51) Int. Cl.
*H04B 7/06* (2006.01)
*H04W 24/10* (2009.01)
(Continued)

(52) U.S. Cl.
CPC ......... *H04B 7/0695* (2013.01); *H04B 7/0626* (2013.01); *H04L 5/005* (2013.01);
(Continued)

(58) Field of Classification Search
None
See application file for complete search history.

(56) References Cited

U.S. PATENT DOCUMENTS

| | | | |
|---|---|---|---|
| 2018/0020479 A1* | 1/2018 | Harada | H04W 74/006 |
| 2019/0253986 A1* | 8/2019 | Jeon | H04W 72/042 |

(Continued)

OTHER PUBLICATIONS

Huawei, et al., "Enhancement to Initial Access in NR Unlicensed", 3GPP Draft, 3GPP TSG RAN WG1 Meeting #97, R1-1906045, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, May 13, 2019 (May 13, 2019), XP051727502, 14 pages, Retrieved from the Internet: URL: http://www.3gpp.org/ftp/Meetings%5F3GPP%5FSYNC/RAN1/Docs/R1%2D1906045%2Ezip, [retrieved on May 13, 2019] section 3.1, 1-6, first line, p. 6, paragraph 0005.
(Continued)

*Primary Examiner* — Scott M Sciacca
(74) *Attorney, Agent, or Firm* — Arent Fox, LLP

(57) ABSTRACT

In an aspect, the present disclosure includes a method, apparatus, and computer readable medium for wireless communications for determining, by a user equipment (UE), an evaluation time period based on a number of a plurality of reference signals that are quasi-co-located (QCL) within one or more measurement windows; measuring, by the UE, a signal quality value of one or more of reference signals within the evaluation time period; and determining, by the UE, whether the signal quality value of one or more of reference signals within the evaluation time period crosses an evaluation threshold.

30 Claims, 12 Drawing Sheets

(51) Int. Cl.
  *H04W 56/00*   (2009.01)
  *H04W 24/08*   (2009.01)
  *H04B 17/318*  (2015.01)
  *H04L 5/00*    (2006.01)
  *H04W 76/19*   (2018.01)
  *H04W 48/16*   (2009.01)

(52) U.S. Cl.
  CPC ........... *H04W 24/08* (2013.01); *H04W 24/10* (2013.01); *H04W 48/16* (2013.01); *H04W 56/001* (2013.01); *H04W 76/19* (2018.02)

(56) References Cited

U.S. PATENT DOCUMENTS

| | | | |
|---|---|---|---|
| 2019/0349797 A1* | 11/2019 | Lin | H04W 24/10 |
| 2022/0022064 A1* | 1/2022 | Raghavan | H04W 24/02 |
| 2022/0061116 A1* | 2/2022 | Lim | H04W 24/08 |
| 2022/0086740 A1* | 3/2022 | Li | H04B 7/088 |
| 2022/0167397 A1* | 5/2022 | Thangarasa | H04W 74/08 |

OTHER PUBLICATIONS

Nokia et al., "RLM/RLF Measurement on NR-U," 3GPP Draft, 3GPP TSG-RAN WG2 Meeting #106, R2-1906747, RLM Rlf Measurement on NR-U, 3rd Generation Partnership Project (3GPP), Mobile Competence Centre, 650, Route Des Lucioles, F-06921, Sophia-Antipolis Cedex, France, vol. RAN WG2, No. Reno, Nevada, US, May 13, 2019-May 17, 2019, May 13, 2019 (May 13, 2019), XP051730203, 4 pages, Retrieved from the Internet: URL: http://www.3gpp.org/ftp/Meetings%5F3GPP%5FSYNC/RAN2/Docs/R2%2D1906747%2Ezip [retrieved on May 13, 2019], the whole document.

Partial International Search Report—PCT/US2020/046537—ISA/EPO—dated Oct. 8, 2020.

International Search Report and Written Opinion—PCT/US2020/046537—ISA/EPO—dated Dec. 3, 2020.

* cited by examiner

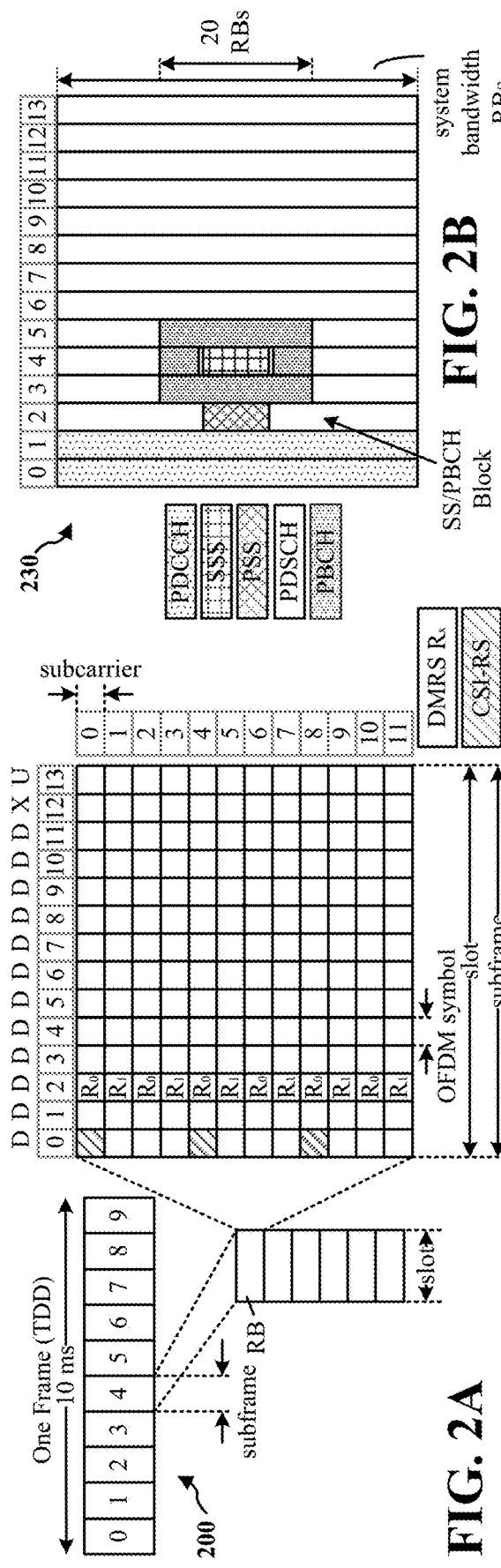
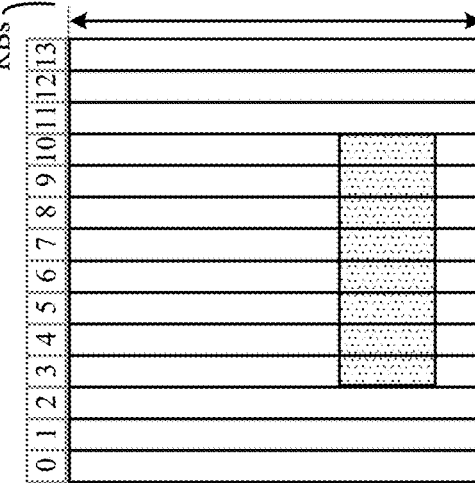
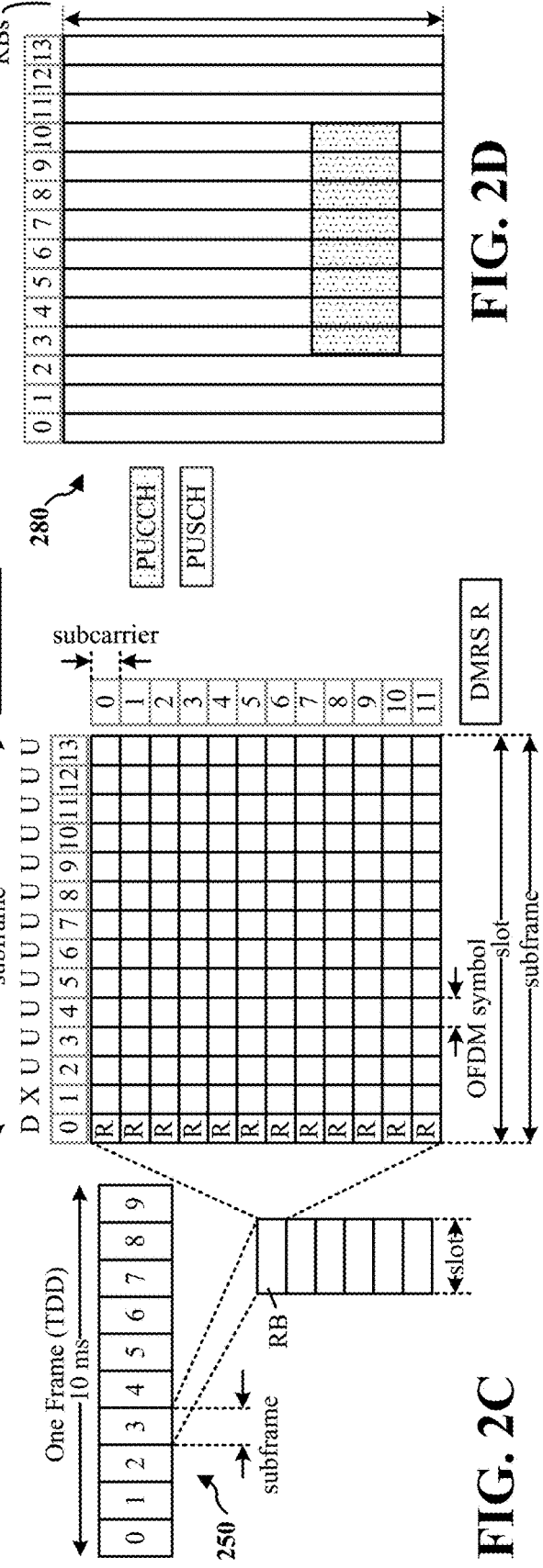
FIG. 2A  FIG. 2B  FIG. 2C  FIG. 2D

EVALUATION PERIOD FOR BEAM FAILURE DETECTION AND CANDIDATE BEAM DETECTION IN MULTI-BEAM NR-U

CROSS-REFERENCE TO RELATED APPLICATION(S)

The present application claims benefit of and priority to U.S. Provisional Application No. 62/888,112 entitled "EVALUATION FOR BEAM FAILURE DETECTION AND CANDIDATE BEAM DETECTION IN MULTI-BEAM NR-U" filed Aug. 16, 2019, and is assigned to the assignee hereof and hereby expressly incorporated by reference herein.

BACKGROUND

Technical Field

The present disclosure relates generally to communication systems, and more particularly, to determining evaluation period(s) for beam failure detection and candidate beam detection in multi-beam NR-U.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

Due to the increasing demand for wireless communications, there is a desire to improve the efficiency of wireless communication network techniques.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method of wireless communication is provided. The method includes determining, by a user equipment (UE), an evaluation time period based on a number of a plurality of reference signals that are quasi-co-located (QCL) within one or more measurement windows; measuring, by the UE, a signal quality value of one or more of reference signals within the evaluation time period; and determining, by the UE, whether the signal quality value of one or more of reference signals within the evaluation time period crosses an evaluation threshold.

In a further example, an apparatus for wireless communication is provided that includes a transceiver, a memory configured to store instructions, and one or more processors communicatively coupled with the transceiver and the memory. The apparatus may include the one or more processors being configured to execute the instructions to determine, by a UE, an evaluation time period based on a number of a plurality of reference signals that are QCL within one or more measurement windows; measure, by the UE, a signal quality value of one or more of reference signals within the evaluation time period; and determine, by the UE, whether the signal quality value of one or more of reference signals within the evaluation time period crosses an evaluation threshold.

In another aspect, an apparatus (e.g., a user equipment (UE)) for wireless communication is provided that includes means for determining, by the UE, an evaluation time period based on a number of a plurality of reference signals that are QCL within one or more measurement windows; means for measuring, by the UE, a signal quality value of one or more of reference signals within the evaluation time period; and means for determining, by the UE, whether the signal quality value of one or more of reference signals within the evaluation time period crosses an evaluation threshold.

In yet another aspect, a non-transitory computer-readable medium is provided including one or more processor executing code for determining, by a UE, an evaluation time period based on a number of a plurality of reference signals that are QCL within one or more measurement windows; code for measuring, by the UE, a signal quality value of one or more of reference signals within the evaluation time period; and code for determining, by the UE, whether the signal quality value of one or more of reference signals within the evaluation time period crosses an evaluation threshold.

In another example, a method for wireless communication includes determining, by a UE, a number of a plurality of reference signals that are QCL within one or more measurement windows; measuring, by the UE, a signal quality value of one or more of the plurality of reference signals within one or more measurement windows within an evaluation time period; and determining, by the UE, the signal quality of the each of the plurality of reference signals within the measurement window failing to cross an evaluation threshold if the signal quality value of the each of the plurality of reference signals within the measurement window fail to cross an evaluation threshold.

In a further example, an apparatus (e.g., the UE) for wireless communication is provided that includes a transceiver, a memory configured to store instructions, and one or more processors communicatively coupled with the transceiver and the memory. The apparatus may include the one or more processors being configured to execute the instructions to determine, by a UE, a number of a plurality of reference signals that are QCL within one or more measurement windows; measure, by the UE, a signal quality value of one or more of the plurality of reference signals within one or more measurement windows within an evaluation time period; and determine, by the UE, the signal quality of the each of the plurality of reference signals within the measurement window failing to cross an evaluation threshold if the signal quality value of the each of the plurality of reference signals within the measurement window fail to cross an evaluation threshold.

In another aspect, an apparatus (e.g., the UE) for wireless communication is provided that includes means for determining, by the UE, a number of a plurality of reference signals that are QCL within one or more measurement windows; means for measuring, by the UE, a signal quality value of one or more of the plurality of reference signals within one or more measurement windows within an evaluation time period; and means for determining, by the UE, the signal quality of the each of the plurality of reference signals within the measurement window failing to cross an evaluation threshold if the signal quality value of the each of the plurality of reference signals within the measurement window fail to cross an evaluation threshold.

In yet another aspect, a non-transitory computer-readable medium is provided including one or more processor executing code for determining, by a UE, a number of a plurality of reference signals that are QCL within one or more measurement windows; code for measuring, by the UE, a signal quality value of one or more of the plurality of reference signals within one or more measurement windows within an evaluation time period; and code for determining, by the UE, the signal quality of the each of the plurality of reference signals within the measurement window failing to cross an evaluation threshold if the signal quality value of the each of the plurality of reference signals within the measurement window fail to cross an evaluation threshold.

In another example, a method for wireless communication includes determining, by a UE, an evaluation time period that includes an opportunity for a plurality of reference signals to be included; determining, by the UE, whether one or more of the plurality of reference signals is not received; adjusting, by the UE, the evaluation time period based on a determination that the one or more of the plurality of reference signals is not received.

In a further example, an apparatus for wireless communication is provided that includes a transceiver, a memory configured to store instructions, and one or more processors communicatively coupled with the transceiver and the memory. The apparatus may include the one or more processors being configured to execute the instructions to determine, by a UE, an evaluation time period that includes an opportunity for a plurality of reference signals to be included; determine, by the UE, whether one or more of the plurality of reference signals is not received; adjust, by the UE, the evaluation time period based on a determination that the one or more of the plurality of reference signals is not received.

In another aspect, an apparatus for wireless communication is provided that includes means for determining, by a UE, an evaluation time period that includes an opportunity for a plurality of reference signals to be included; means for determining, by the UE, whether one or more of the plurality of reference signals is not received; means for adjusting, by the UE, the evaluation time period based on a determination that the one or more of the plurality of reference signals is not received.

In yet another aspect, a non-transitory computer-readable medium is provided including one or more processor executing code for determining, by a UE, an evaluation time period that includes an opportunity for a plurality of reference signals to be included; code for determining, by the UE, whether one or more of the plurality of reference signals is not received; code for adjusting, by the UE, the evaluation time period based on a determination that the one or more of the plurality of reference signals is not received.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively, in accordance with various aspects of the present description.

DETAILED DESCRIPTION

Figure 1:
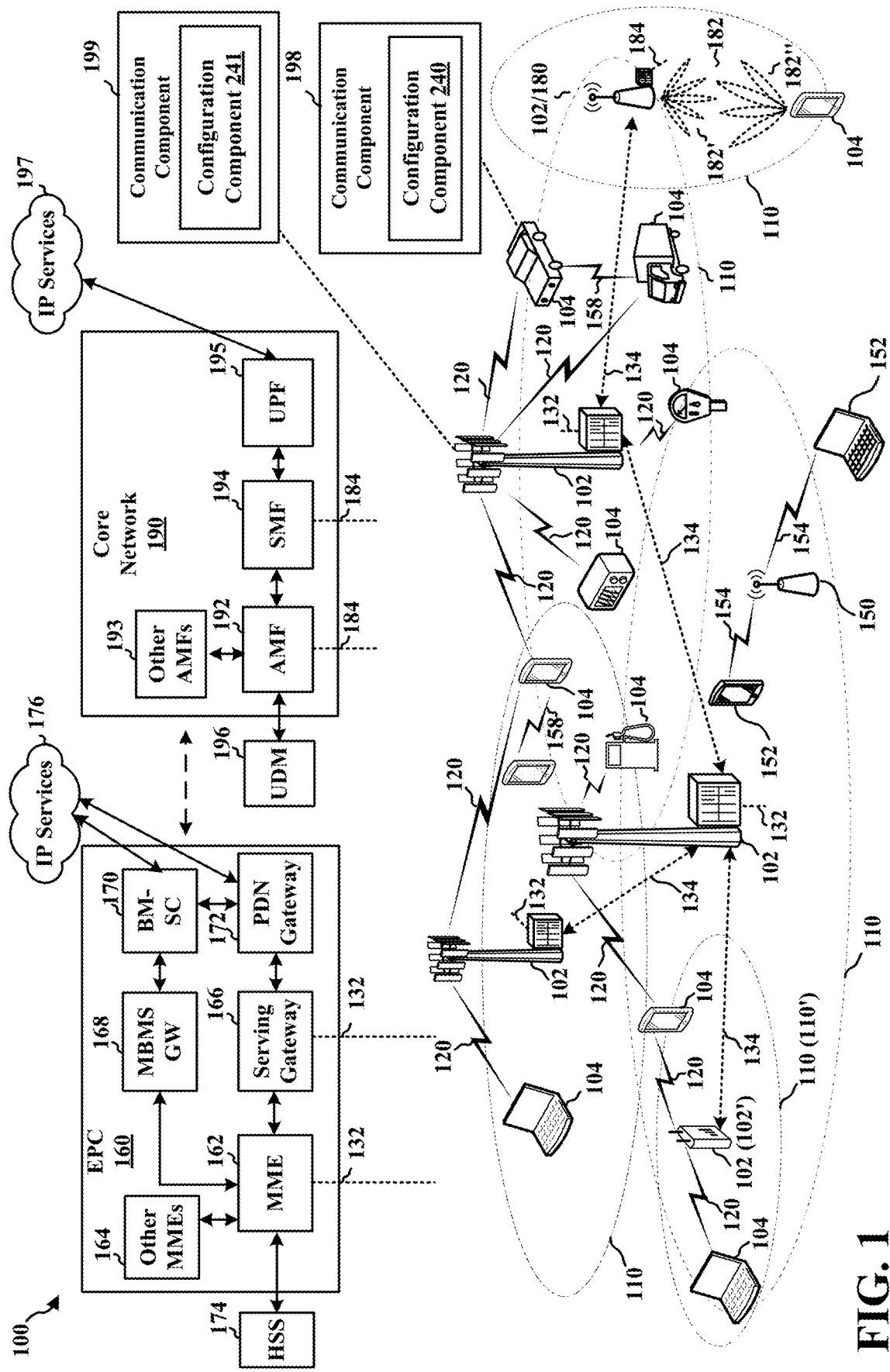
FIG. 1 is a diagram illustrating an example of a wireless communications system and an access network, in accordance with various aspects of the present description.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software may be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

The described aspects relate to apparatus and methods for determining evaluation period(s) for beam failure detection and candidate beam detection in multi-beam NR-U in wireless communication systems. For example, in an aspect, an evaluation time period based on a number of a plurality of reference signals that are quasi-co-located (QCL) within one or more measurement windows may be determined. As such, the present disclosure provides techniques for the network to transmit a higher number of samples of reference signals within an SMTC/DMTC window.

FIG. 1 is a diagram illustrating an example of a wireless communications system and an access network 100 configured for determining evaluation period(s) for beam failure detection and candidate beam detection in multi-beam NR-U. The wireless communications system (also referred to as a wireless wide area network (WWAN)) includes base stations 102, UEs 104, an Evolved Packet Core (EPC) 160, and another core network 190 (e.g., a 5G Core (5GC)).

In certain aspects, the UE 104 may be configured to operate communication component 198 and/or configuration component 240 to determine an evaluation time period based on a number of a plurality of reference signals that are quasi-co-located (QCL) within one or more measurement windows, measure a signal quality value of one or more of reference signals within the evaluation time period, and determine whether the signal quality value of one or more of reference signals within the evaluation time period crosses an evaluation threshold.

In further aspects, UE 104 may be configured to operate communication component 198 and/or configuration component 240 to determine a number of a plurality of reference signals that are QCL within one or more measurement windows, measure a signal quality value of one or more of the plurality of reference signals within one or more measurement windows within an evaluation time period, and determine the signal quality of the each of the plurality of reference signals within the measurement window failing to cross an evaluation threshold if the signal quality value of the each of the plurality of reference signals within the measurement window fail to cross an evaluation threshold.

In further aspects, UE 104 may be configured to operate communication component 198 and/or configuration component 240 to determine an evaluation time period that includes an opportunity for a plurality of reference signals to be included, wherein the plurality of reference signals are configured for different types of measurements, determine whether one or more of the plurality of reference signals is not received, and adjust the evaluation time period based on a determination that the one or more of the plurality of reference signals is not received.

Correspondingly, in certain aspects, the network entity 102 (e.g., base station) may be configured to operate CC communication component 199 and/or configuration component 241 to transmit one or more reference signals that are QCL within one or more measurement windows to UE 104.

The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 105' or a large cell (e.g., macro base station), may include an eNB, gNodeB (gNB), or other type of base station. Some base stations, such as gNB 180 may operate in one or more frequency bands within the electromagnetic spectrum. The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 110 to compensate for the path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIGS. 2A-2D include diagrams of example frame structures and resources that may be utilized in communications between the base stations 102, the UEs 104, and/or the secondary UEs (or sidelink UEs) 110 described in this disclosure. FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and 2µ slots/subframe. The subcarrier spacing and symbol length/duration are a function of the numerology. The subcarrier spacing may be equal to $2^{\mu}*15$ kHz, where µ is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 2A-2D provide an example of slot configuration 0 with 14 symbols per slot and numerology µ=0 with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
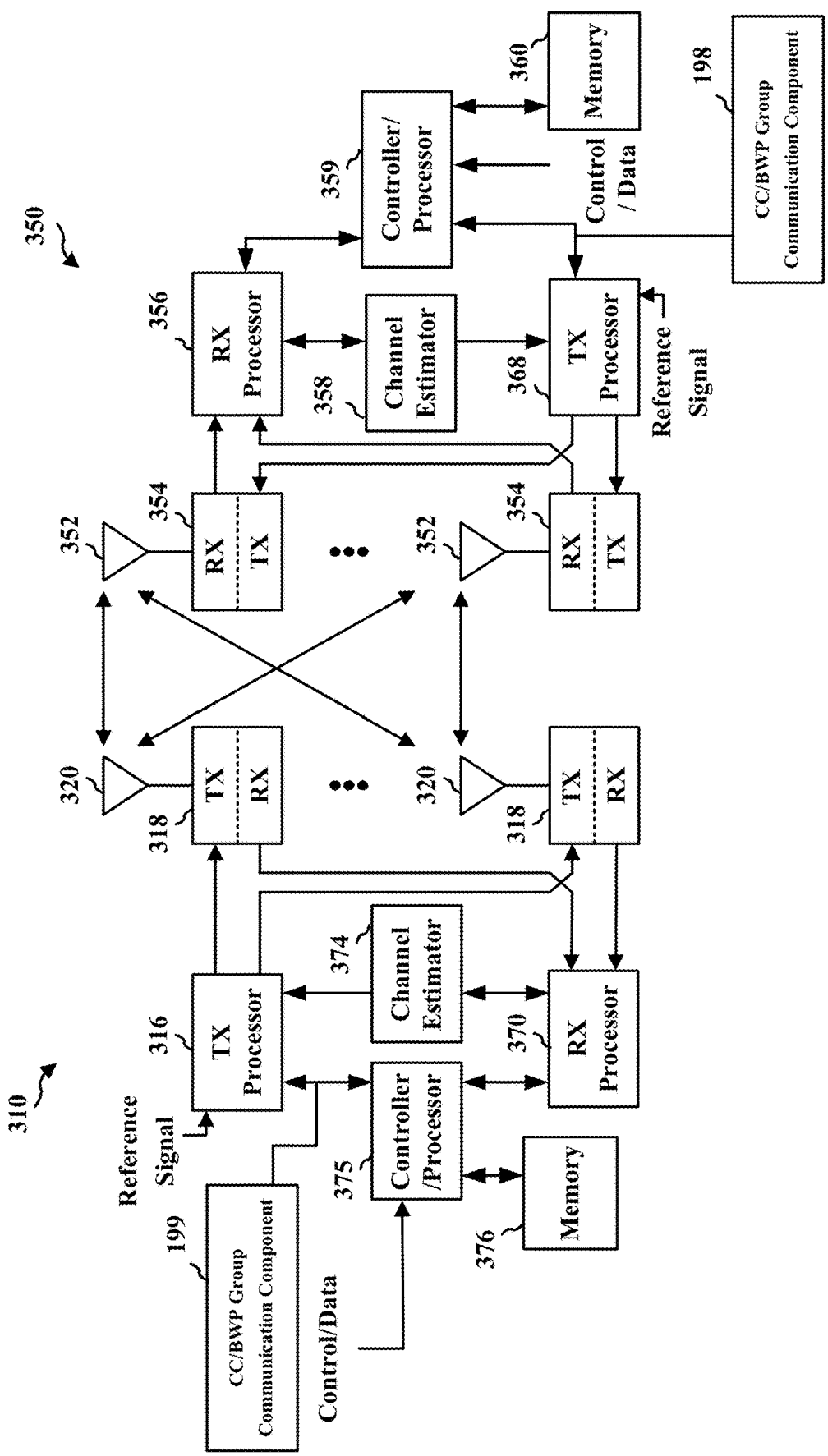
FIG. 3 is a diagram illustrating an example of a base station and user equipment (UE) in an access network, in accordance with various aspects of the present description.

FIG. 3 is a block diagram of a base station 310 in communication with a UE 350 in an access network, where the base station 310 may be an example implementation of base station 102 and where UE 350 may be an example implementation of UE 104. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with communication component 198 of FIG. 1.

At least one of the TX processor 316, the RX processor 370, and the controller/processor 375 may be configured to perform aspects in connection with communication component 199 of FIG. 1.

Referring to FIGS. 4-12, the described features generally relate to the determining evaluation period(s) for beam failure detection and candidate beam detection in multi-beam NR-U. For example, in Release 15, an evaluation period for beam failure detection (BFD) and candidate beam detection (CBD) in NR Unlicensed networks (NR-U) are defined. The UE may evaluate whether a beam has failed or a new beam's quality has exceed above threshold during these periods.

These evaluation periods may depend on several factors, e.g. the periodicity of reference signals, DRX cycle, the overlapping between SS block measurement timing windows and measurement gaps, etc. However, in NR-U networks, the network may need to back off instead of transmitting reference signals to meet 'listen before talk' requirements. Hence, the evaluation periods of BFD and CBD may consider the number of "missed opportunities", i.e., the number of reference signal periods where gNB could not transmit reference signals due to LBT.

In an aspect, in Release 16, a network may transmit multiple reference signals (e.g. Synchronization signal blocks, discovery reference signals, CSI-RS) within the same SMTC/discovery measurement reference signal timing configuration (DMTC) window that are quasi-co-located with each other. This would allow the network to transmit a higher number of samples of reference signals within an SMTC/DMTC window than that within licensed Release 15 networks. This should also be considered while designing the evaluation periods of BFD and CBD.

For example, in an aspect, the present disclosure includes a method, apparatus, and computer readable medium for wireless communications for determining evaluation period(s) for beam failure detection and candidate beam detection in multi-beam NR-U. The aspect may include determining, by a UE, an evaluation time period based on a number of a plurality of reference signals that are QCL within one or more measurement windows; measuring, by the UE, a signal quality value of one or more of reference signals within the evaluation time period; and determining, by the UE, whether the signal quality value of one or more of reference signals within the evaluation time period crosses an evaluation threshold.

In another example, in an aspect, the present disclosure includes a method, apparatus, and computer readable medium for wireless communications for determining, by a UE, a number of a plurality of reference signals that are QCL within one or more measurement windows; measuring, by the UE, a signal quality value of one or more of the plurality of reference signals within one or more measurement windows within an evaluation time period; and determining, by the UE, the signal quality of the each of the plurality of reference signals within the measurement window failing to cross an evaluation threshold if the signal quality value of the each of the plurality of reference signals within the measurement window fail to cross an evaluation threshold.

In another example, in an aspect, the present disclosure includes a method, apparatus, and computer readable medium for wireless communications for determining, by a UE, an evaluation time period that includes an opportunity for a plurality of reference signals to be included, wherein the plurality of reference signals are configured for different types of measurements; determining, by the UE, whether one or more of the plurality of reference signals is not received; adjusting, by the UE, the evaluation time period based on a determination that the one or more of the plurality of reference signals is not received.

Figure 4:
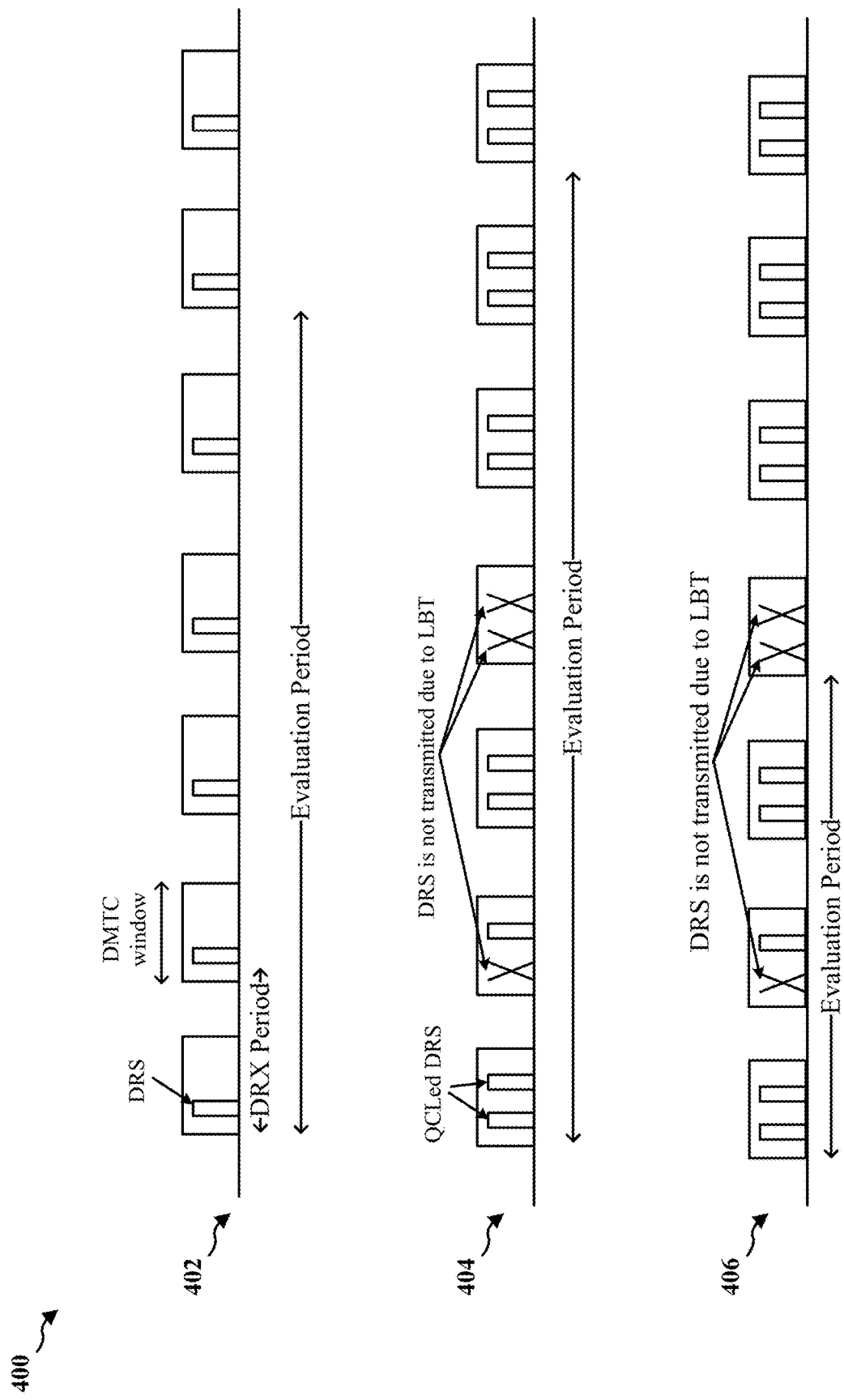
FIG. 4 is a diagram illustrating an example of RLM/BFD/CBD evaluation period(s) in NR-U networks, in accordance with various aspects of the present description.

FIG. 4 is a diagram 400 illustrating an example of RLM/BFD/CBD evaluation period(s) in NR-U networks between a UE and base station (BS). For example, the UE may be similar to or the same as UE 104 of FIG. 1, and the BS may be similar to or the same as base stations 102.

In an aspect, the UE may communicate with the BS and may be configured to perform Radio Link Monitoring (RLM) and Radio Resource Management (RRM) across a plurality of windows. For example, in evaluation period 402 each DMTC window include a DRS for each DRX period. Evaluation period 404 includes DMTC windows with QCLed DRS in each. In certain aspects, DRS may not be transmitted in some DMTC windows due to LBT. Accordingly, evaluation period 404 may be extended to adjust for the missing DRS. Evaluation period 406 may similarly include DMTC windows with missing DRS that were not transmitted due to LBT. Accordingly, evaluation period 406 may be adjusted after the missing DRS in each of the one or more DMTC windows.

Figure 5:
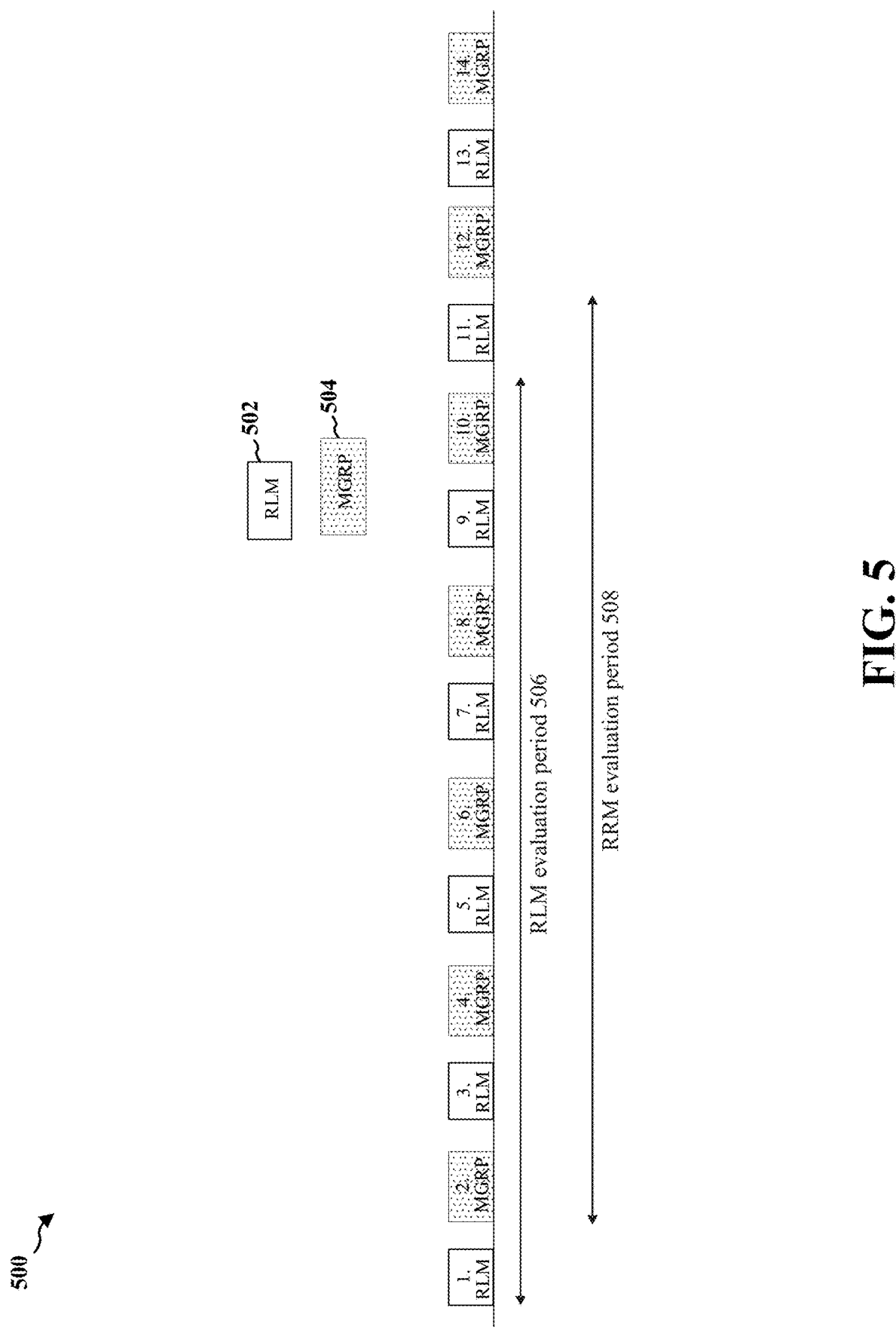
FIG. 5 is a diagram illustrating an example of an evaluation period in a licensed network, in accordance with various aspects of the present description.

FIG. 5 is a diagram 500 illustrating an example of an evaluation period in a licensed network between a UE and base station (BS). For example, the UE may be similar to or the same as UE 104 of FIG. 1, and the BS may be similar to or the same as base stations 102.

In an aspect, the UE may communicate with the BS and may be configured to perform RLM and RRM across a plurality of windows. For example, DMTC window(s) 502 may be used for RLM and DMTC window(s) 504 may be used for RRM. In this example, the RLM and RRM resources overlap and have a sharing factor (P) of 2. In the licensed network, UE may use the DMTC windows 502 and 504 alternatively for RLM and RRM.

In certain aspects, without overlap, the evaluation period for RLM and RRM would have been equal to five DMTC periods. Due to sharing, RLM evaluation period 506 and RRM evaluation period 508 become equal to 10 evaluation periods. For example, the evaluation periods 506 and 508 may be determined based on:

$$\text{Evaluation period}=5*P*T_{DRS}=5*2*T_{DRS}=10*T_{DRS}$$

Figure 6:
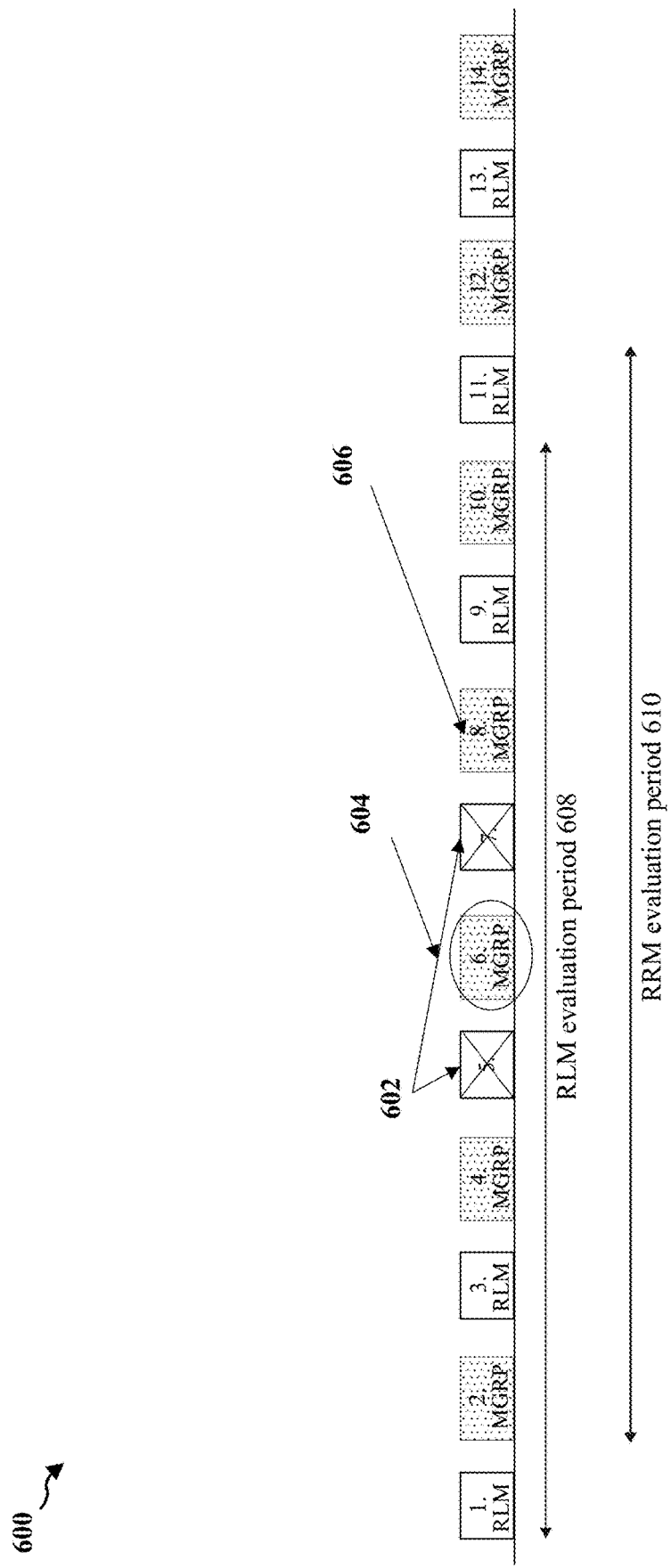
FIG. 6 is a diagram illustrating an example of an evaluation period with a sharing factor in NR-U networks, in accordance with various aspects of the present description.

FIG. 6 is a diagram 600 illustrating an example of an example of an evaluation period with a sharing factor in NR-U networks between a UE and base station (BS). For example, the UE may be similar to or the same as UE 104 of FIG. 1, and the BS may be similar to or the same as base stations 102.

In an aspect, the UE may communicate with the BS and may be configured to perform RLM and RRM across a plurality of windows. For example, the initial evaluation pattern of the UE may be configured such that the even numbered samples correspond to MGRP resources and the odd numbered samples correspond to RLM resources. In this example, DMTC windows 602 (corresponding to the fifth and seventh windows) have no DRS available due to LBT requirements. Since the UE has missed the RLM evaluation in the fifth window (i.e., DMTC window 602), the UE may change the evaluation pattern. Accordingly, the sixth DMTC window 604 corresponds to RLM resources such that the even numbered samples now correspond to RLM resources and the odd numbered samples now correspond to MGRP resources.

Further, in this example, since the UE missed the RRM evaluation in the seventh window (i.e., DMTC window 602), the UE may again change the evaluation pattern. Accordingly, the eighth DMTC window 606 corresponds to MGRP resources such that the even numbered samples now correspond to MGRP resources and the odd numbered samples now correspond to RLM resources.

In certain aspects, the number of "missed" DMTC windows 602 due to LBT requirements across both evaluation periods 608 and 610. Due to sharing factor of 2, RLM evaluation period 608 and RRM evaluation period 610 may be determined based on:

$$\text{Evaluation period}=(5*P+L)*TDRS=(5*2+2)*TDRS=12*TDRS$$

where L is the number of DMTC periods during the evaluation period where the corresponding DRS is not transmitted or is not available, which may be due to LBT requirements.

As described herein, the equation is configured to minimize the "worst" case scenario for the evaluation period across different measurements.

Figure 7:
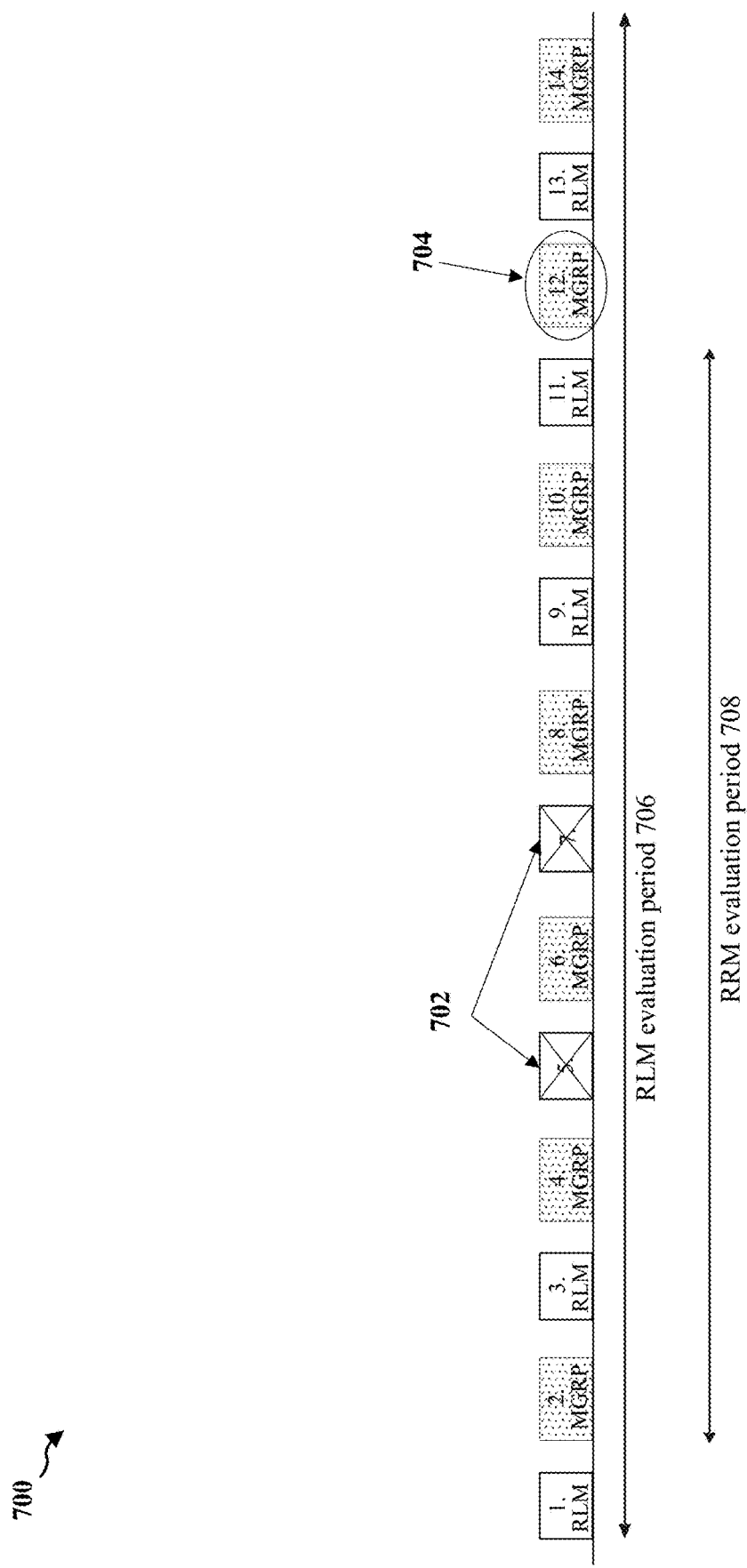
FIG. 7 is a diagram illustrating another example of an evaluation period with a sharing factor in NR-U networks, in accordance with various aspects of the present description.

FIG. 7 is a diagram 700 illustrating another example of an evaluation period with a sharing factor in NR-U networks between a UE and base station (BS). For example, the UE may be similar to or the same as UE 104 of FIG. 1, and the BS may be similar to or the same as base stations 102.

In an aspect, the UE may communicate with the BS and may be configured to perform RLM and RRM across a plurality of windows. For example, the initial evaluation pattern of the UE may be configured such that the even numbered samples correspond to MGRP resources and the odd numbered samples correspond to RLM resources. In this example, DMTC windows 702 (corresponding to the fifth and seventh windows) have no DRS available due to LBT requirements. Since the UE has missed the RLM evaluation in the fifth window (i.e., DMTC window 702), the UE may use the twelfth DMTC window 704 for RRM. Accordingly, the RLM evaluation period 706 becomes greater than the RRM evaluation period 708.

In certain aspects, the number of "missed" DMTC windows 602 due to LBT requirements across both evaluation periods 608 and 610. RLM evaluation period 608 and RRM evaluation period 610 may be determined based on:

$$\text{Evaluation period for RLM}=(5+L)*P*TDRS=(5+2)*2*TDRS=14*TDRS$$

$$\text{Evaluation period for RRM}=(5+L)*P*TDRS=(5+0)*2*TDRS=10*TDRS$$

where L is the number of DMTC periods during the evaluation period where the corresponding DRS is not transmitted or is not available, which may be due to LBT requirements.

As described herein, the number of "missed" DMTC windows due to LBT during individual RLM evaluation equals 2. Further, the number of "missed" DMTC windows due to LBT during individual RRM evaluation is equal to 0.

Figure 8:
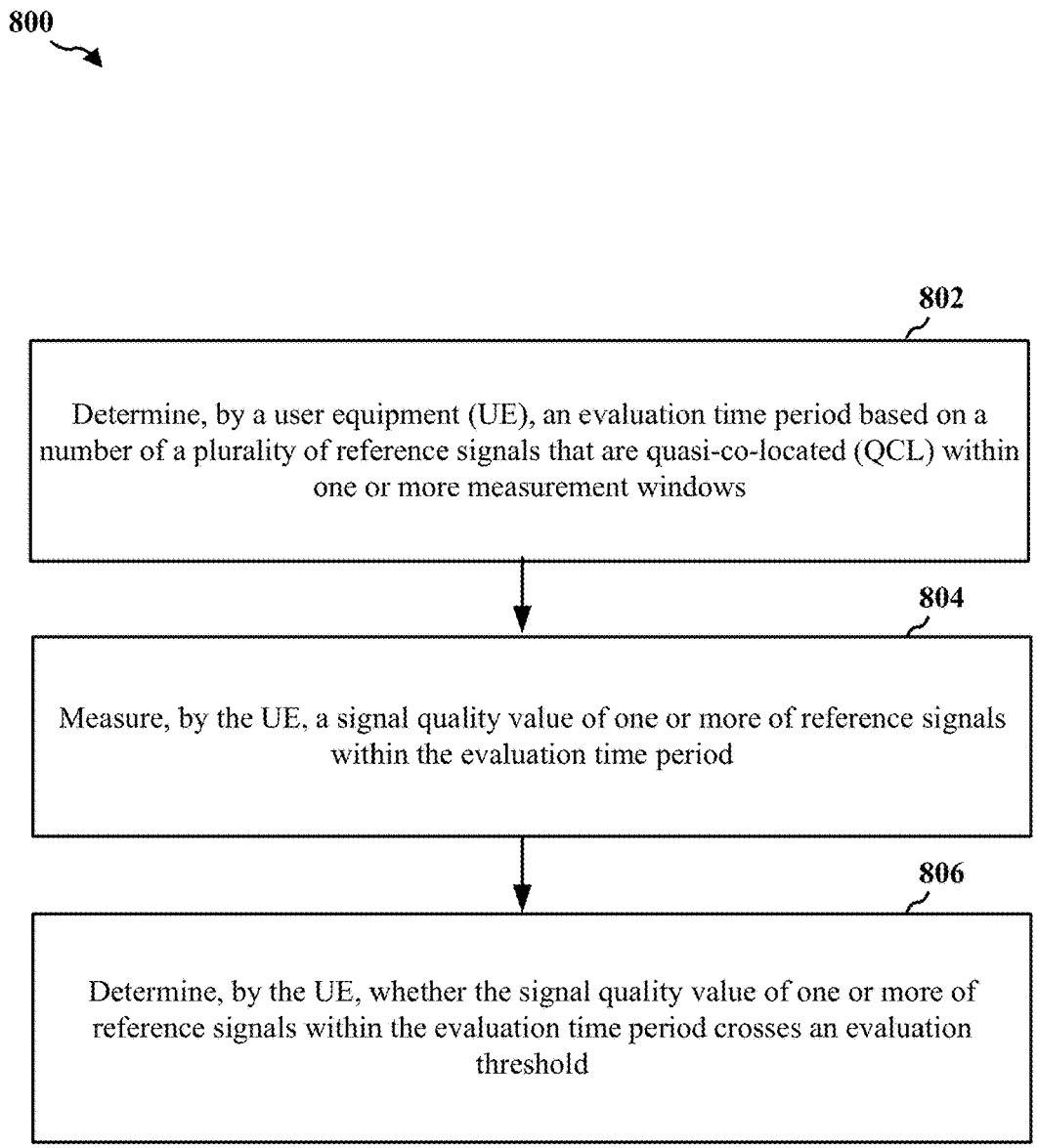
FIG. 8 is a flowchart of a method of wireless communication of a UE capable of determining an evaluation period based on a number of QCL reference signals within an evaluation time period, in accordance with various aspects of the present description.

FIG. 8 is a flowchart 800 of a method of wireless communication. The method may be performed by a UE (e.g., the UE 104; the apparatus 350; the controller/processor 359, which may include the memory 360, processor(s) 1112, which may include the memory 1116, modem 1140 and which may be the entire UE 104 or a component of the UE 104, such as the TX processor 368, the RX processor 356, and/or the transceiver 1102).

At 802, method 800 includes determining, by a user equipment (UE), an evaluation time period based on a number of a plurality of reference signals that are quasi-co-located (QCL) within one or more measurement windows. In an aspect, the UE 104 and/or the communication component 198/configuration component 240, e.g., in conjunction with controller/processor 359, which may include the memory 360, processor(s) 812, which may include the memory 1116, modem 1140, TX processor 368, and transceiver 1102 may determine an evaluation time period based on a number of a plurality of reference signals that are QCL within one or more measurement windows. As such, the UE 104 and/or the communication component 198/configuration component 240, e.g., in conjunction with controller/processor 359, which may include the memory 360, processor(s) 1112, which may include the memory 1116, modem 1140, TX processor 368, and transceiver 1102 may define a means for determining, by a UE, an evaluation time period based on a number of a plurality of reference signals that are QCL within one or more measurement windows.

In an example of method 800, determining the evaluation time period further comprises determining the first evaluation time period based on a number of measurement windows with missing reference signals. Further, the missing reference signals are due to listen before talk requirements.

In an example of method 800, determining the evaluation time period further comprises determining the evaluation time period based on a number of reference signal prevented from transmission due to listen-before-talk requirements.

In an example, method 800 includes determining, by the UE, whether the measurement window overlaps with one or more measurement gaps; and wherein determining the evaluation time period further comprises determining the evaluation time period based a determination that the measurement window overlaps with the one or more measurement gaps.

In an example of method 800, the plurality of reference signals correspond to at least one of discovery reference signals (DRS), synchronization signal blocks (SSB), and channel state information reference signals (CSI-RS).

In an example of method 800, the one or more measurement windows correspond to one or more discovery measurement timing configuration (DMTC) windows.

At 804, method 800 includes measuring, by the UE, a signal quality value of one or more of reference signals within the evaluation time period. In an aspect, the UE 104 and/or the communication component 198/configuration component 240, e.g., in conjunction with controller/processor 359, which may include the memory 360, processor(s) 812, which may include the memory 1116, modem 1140, RX processor 356, and transceiver 1102 may measure a signal quality value of one or more of reference signals within the evaluation time period. As such, communication component 198/configuration component 240, e.g., in conjunction with controller/processor 359, which may include the memory 360, processor(s) 1112, which may include the memory 1116, modem 1140, RX processor 356, and transceiver 1102 may define a means for measuring, by the UE, a signal quality value of one or more of reference signals within the evaluation time period.

At 806, method 800 includes determining, by the UE, whether the signal quality value of one or more of reference signals within the evaluation time period crosses an evaluation threshold. In an aspect, the UE 104 and/or the communication component 198/configuration component 240, e.g., in conjunction with controller/processor 359, which may include the memory 360, processor(s) 1112, which may include the memory 1116, modem 1140, RX processor 356, and transceiver 1102 may determine whether the signal quality value of one or more of reference signals within the evaluation time period crosses an evaluation threshold. As such, communication component 198/configuration component 240, e.g., in conjunction with controller/processor 359, which may include the memory 360, processor(s) 1112, which may include the memory 1116, modem 1140, RX processor 356, and transceiver 1102 may define a means for determining, by the UE, whether the signal quality value of one or more of reference signals within the evaluation time period crosses an evaluation threshold.

In an example, method 800 includes determining, by the UE, whether a number of missing reference signals in the one or more measurement windows within the evaluation time period exists; and adjusting, by the UE, the first evaluation time period based on a determination that the number of missing reference signals exist.

In an example, method 800 includes generating, by the UE, an out-of-synchronization indication based on a determination that the signal quality value of one or more of the plurality of reference signals within the evaluation time period crosses the evaluation threshold; initiating, by the UE, a Radio Link Failure (RLF) procedure in response to generating the out-of-synchronization indication; and determining, by the UE, whether a subsequent signal quality value of any of the plurality of reference signals crosses the evaluation threshold during the RLF procedure.

In an example, method 800 include generating, by the UE, an in-synchronization indication based on a determination that the subsequent signal quality value of any of the plurality of reference signals fails to cross the evaluation threshold during the RLF procedure; and ceasing, by the UE, the RLF procedure in response to generating the in-synchronization indication.

In an example, method 800 includes proceeding, by the UE, with the RLF procedure based on a determination that the subsequent signal quality value of any of the plurality of reference signals crosses the evaluation threshold during the RLF procedure.

In an example, method 800 includes increasing, by the UE, a beam failure detection (BFD) count value based on a determination that the signal quality value of one or more of the plurality of reference signals within the evaluation time period crosses the evaluation threshold.

In an example, method 800 includes determining, by the UE, whether the BFD count value exceeds a count threshold; and searching, by the UE, for a new beam based on a determination that the BFD count value exceeds the count threshold.

In an example of method 800, searching for the new beam further comprises: determining, by the UE, whether a signal strength of any of the other plurality of reference signals corresponds to one or more additional beams exceeds a beam threshold; transmitting, by the UE to a network entity, an uplink indication identifying a new candidate beam corresponding to the one or more additional beams based on a determination that the signal strength of any of the other plurality of reference signals corresponds to the one or more additional beams exceeds the beam threshold; and communicating, by the UE, using the new candidate beam in response to transmitting the uplink indication.

Figure 9:
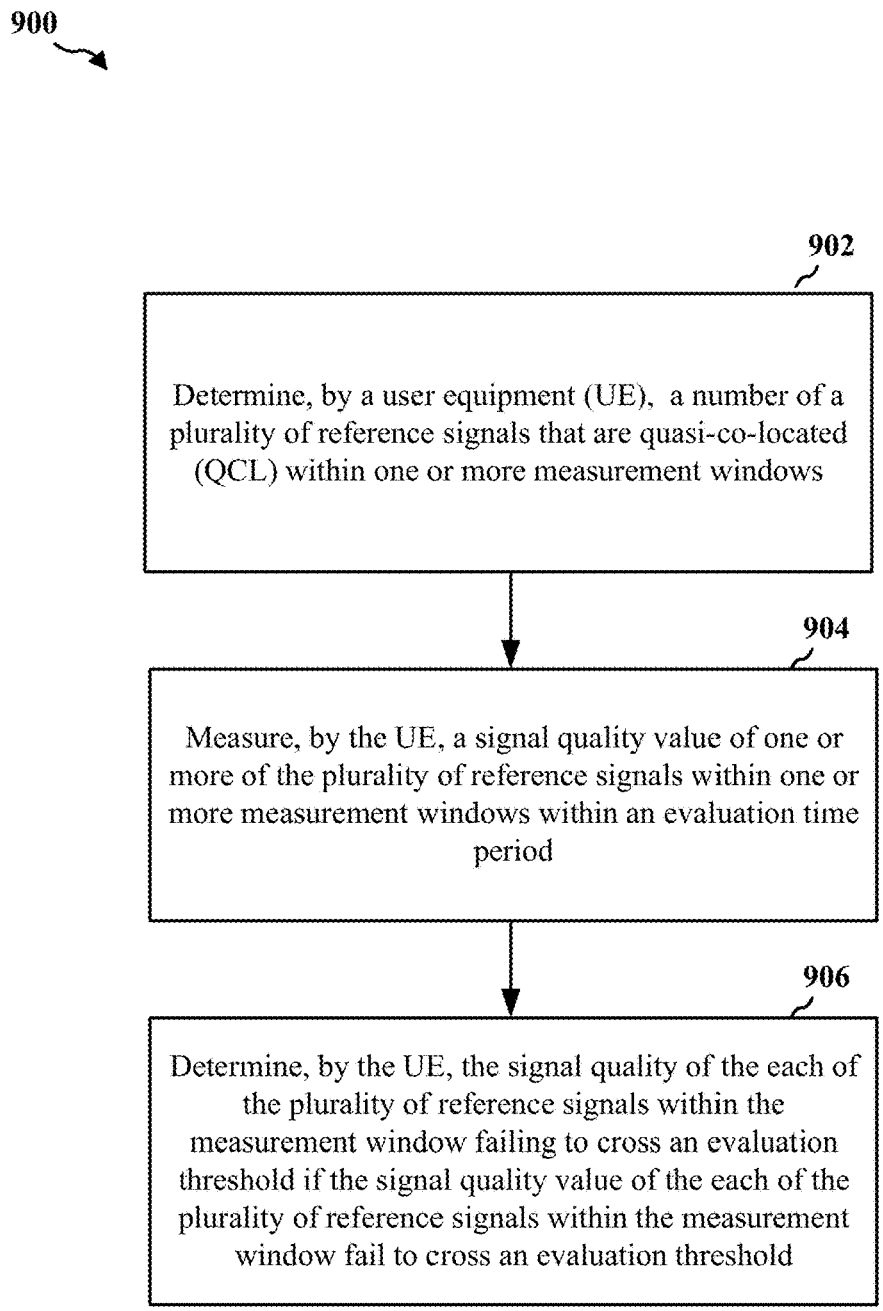
FIG. 9 is a flowchart of a method of wireless communication of a UE capable of determining a number of a plurality of reference signals that are QCL within one or more measurement windows, in accordance with various aspects of the present description.

FIG. 9 is a flowchart 900 of a method of wireless communication. The method may be performed by a UE (e.g., the UE 104; the apparatus 350; the controller/processor 359, which may include the memory 360, processor(s) 1112, which may include the memory 1116, modem 1140 and which may be the entire UE 104 or a component of the UE 104, such as the TX processor 368, the RX processor 356, and/or the transceiver 1102).

At 902, method 900 includes determining, by a UE, a number of a plurality of reference signals that are QCL within one or more measurement windows. In an aspect, the UE 104 and/or the communication component 198/configuration component 240, e.g., in conjunction with controller/processor 359, which may include the memory 360, processor(s) 1112, which may include the memory 1116, modem 1140, TX processor 368, and transceiver 1102 may determine a number of a plurality of reference signals that are QCL within one or more measurement windows. As such, the UE 104 and/or the communication component 198/configuration component 240, e.g., in conjunction with controller/processor 359, which may include the memory 360, processor(s) 1112, which may include the memory 1116, modem 1140, TX processor 368, and transceiver 1102 may define a means for determining, by a UE, a number of a plurality of reference signals that are QCL within one or more measurement windows.

At 904, method 900 includes measuring, by the UE, a signal quality value of one or more of the plurality of reference signals within one or more measurement windows within an evaluation time period. In an aspect, the UE 104 and/or the communication component 198/configuration component 240, e.g., in conjunction with controller/processor 359, which may include the memory 360, processor(s) 1112, which may include the memory 1116, modem 1140, TX processor 368, and transceiver 1102 may measure a signal quality value of one or more of the plurality of reference signals within one or more measurement windows within an evaluation time period. As such, the UE 104 and/or the communication component 198/configuration component 240, e.g., in conjunction with controller/processor 359, which may include the memory 360, processor(s) 1112, which may include the memory 1116, modem 1140, TX processor 368, and transceiver 1102 may define a means for measuring, by the UE, a signal quality value of one or more of the plurality of reference signals within one or more measurement windows within an evaluation time period.

At 906, method 900 includes determining, by the UE, the signal quality of the each of the plurality of reference signals within the measurement window failing to cross an evaluation threshold if the signal quality value of the each of the plurality of reference signals within the measurement window fail to cross an evaluation threshold. In an aspect, the UE 104 and/or the communication component 198/configuration component 240, e.g., in conjunction with controller/processor 359, which may include the memory 360, processor(s) 1112, which may include the memory 1116, modem 1140, TX processor 368, and transceiver 1102 may determine the signal quality of the each of the plurality of reference signals within the measurement window failing to cross an evaluation threshold if the signal quality value of the each of the plurality of reference signals within the measurement window fail to cross an evaluation threshold. As such, the UE 104 and/or the communication component 198/configuration component 240, e.g., in conjunction with controller/processor 359, which may include the memory 360, processor(s) 1112, which may include the memory 1116, modem 1140, TX processor 368, and transceiver 1102 may define a means for determining, by the UE, the signal quality of the each of the plurality of reference signals within the measurement window failing to cross an evaluation threshold if the signal quality value of the each of the plurality of reference signals within the measurement window fail to cross an evaluation threshold.

In an example of method 900, determining, by the UE, the signal quality of the reference signals within a measurement window crossing an evaluation threshold if the signal quality value of at least one reference signal within the plurality of reference signals within the measurement window cross the evaluation threshold.

In an example of method 900, the number of the plurality of reference signals further comprises determining the first evaluation time period based on a number of measurement windows with missing reference signals.

In an example of method 900, the missing reference signals are due to listen before talk requirements.

In an example, method 900 includes determining the evaluation time period further comprises determining the evaluation time period based on a number of reference signal prevented from transmission due to listen-before-talk requirements.

In an example, method 900 includes determining, by the UE, whether the one or more measurement windows overlap with one or more measurement gaps; and wherein determining the evaluation time period further comprises determining the evaluation time period based a determination that the one or more measurement windows overlap with the one or more measurement gaps.

In an example of method 900, the plurality of reference signals correspond to at least one of discovery reference signals (DRS), synchronization signal blocks (SSB), and channel state information reference signals (CSI-RS).

In an example of method 900, the one or more measurement windows correspond to one or more discovery measurement timing configuration (DMTC) windows.

In an example, method 900 includes determining, by the UE, whether a number of missing reference signals in the one or more measurement windows within the evaluation time period exists; and adjusting, by the UE, the first evaluation time period based on a determination that the number of missing reference signals exist.

In an example, method 900 includes generating, by the UE, an out-of-synchronization indication based on a determination that all of the signal quality values of each of the plurality of reference signals within the evaluation time period fail to cross the evaluation threshold.

In an example, method 900 includes initiating, by the UE, a Radio Link Failure (RLF) procedure in response to generating the out-of-synchronization indication.

In an example, method 900 includes determining, by the UE, whether a subsequent signal quality value of any of the plurality of reference signals crosses the evaluation threshold during the RLF procedure.

In an example, method 900 includes generating, by the UE, an in-synchronization indication based on a determination that the subsequent signal quality value of any of the plurality of reference signals fails to cross the evaluation threshold during the RLF procedure; and ceasing, by the UE, the RLF procedure in response to generating the in-synchronization indication.

In an example, method 900 includes proceeding, by the UE, with the RLF procedure based on a determination that the subsequent signal quality value of any of the plurality of reference signals crosses the evaluation threshold during the RLF procedure.

In an example, method 900 includes increasing, by the UE, a beam failure detection (BFD) count value based on a determination that the signal quality value of one or more of the plurality of reference signals within the evaluation time period crosses the evaluation threshold.

In an example, method 900 includes determining, by the UE, whether the BFD count value exceeds a count threshold; and searching, by the UE, for a new beam based on a determination that the BFD count value exceeds the count threshold.

In an example of method 900, searching for the new beam further comprises: determining, by the UE, whether a signal strength of any of the other plurality of reference signals corresponds to one or more additional beams exceeds a beam threshold; transmitting, by the UE to a network entity, an uplink indication identifying a new candidate beam corresponding to the one or more additional beams based on a determination that the signal strength of any of the other plurality of reference signals corresponds to the one or more additional beams exceeds the beam threshold; and communicating, by the UE, using the new candidate beam in response to transmitting the uplink indication.

Figure 10:
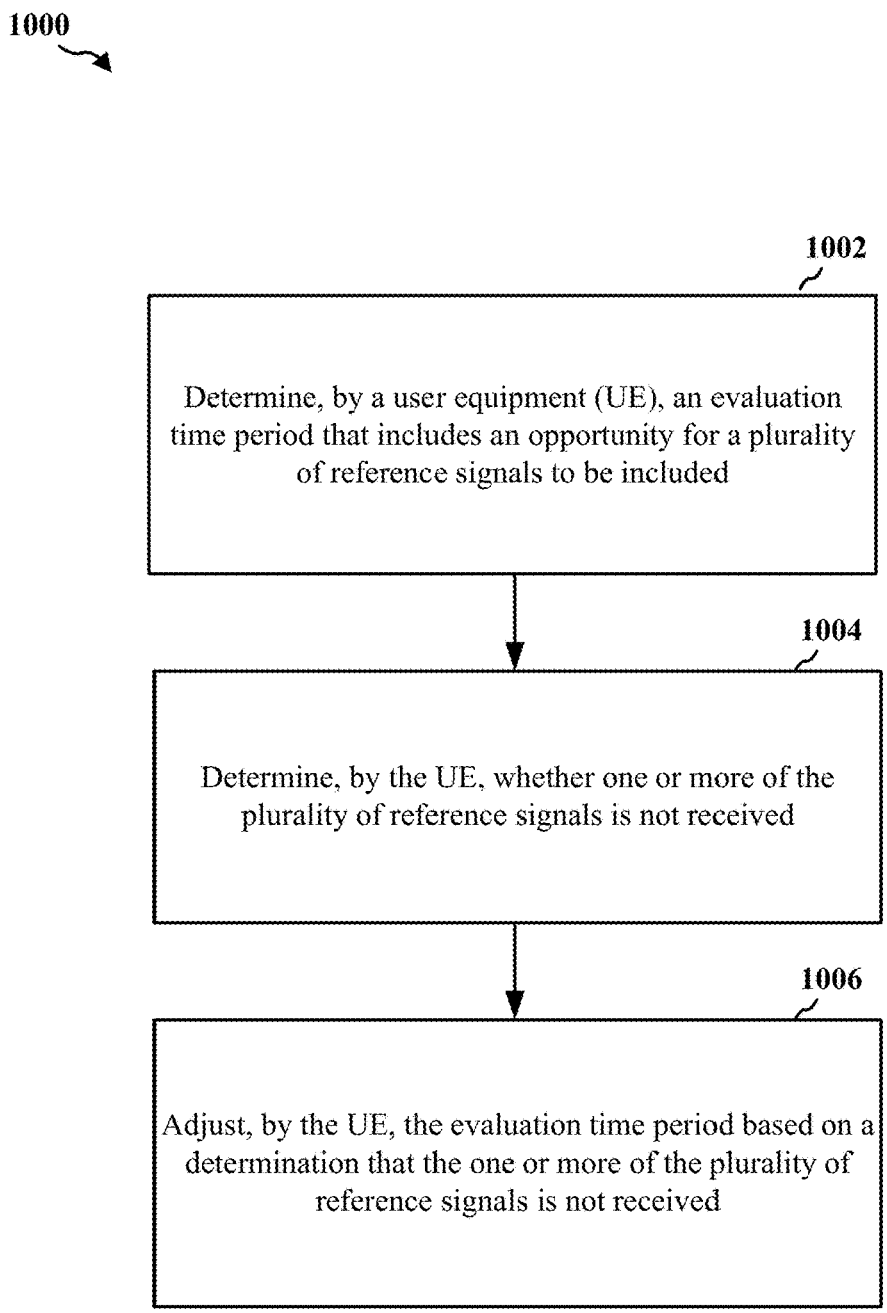
FIG. 10 is a flowchart of a method of wireless communication of a UE capable of adjusting the evaluation time period, in accordance with various aspects of the present description.

FIG. 10 is a flowchart 1000 of a method of wireless communication. The method may be performed by a UE (e.g., the UE 104; the apparatus 350; the controller/processor 359, which may include the memory 360, processor(s) 1112, which may include the memory 1116, modem 1140 and which may be the entire UE 104 or a component of the UE 104, such as the TX processor 368, the RX processor 356, and/or the transceiver 1102).

At 1002, method 1000 includes determining, by a UE, an evaluation time period that includes an opportunity for a plurality of reference signals to be included. In an aspect, the UE 104 and/or the communication component 198/configuration component 240, e.g., in conjunction with controller/processor 359, which may include the memory 360, processor(s) 1112, which may include the memory 1116, modem 1140, TX processor 368, and transceiver 1102 may determine an evaluation time period that includes an opportunity for a plurality of reference signals to be included. As such, the UE 104 and/or the communication component 198/configuration component 240, e.g., in conjunction with controller/processor 359, which may include the memory 360, processor(s) 1112, which may include the memory 1116, modem 1140, TX processor 368, and transceiver 1102 may define a means for determining, by a UE, an evaluation time period that includes an opportunity for a plurality of reference signals to be included.

In an example of method 1000, a sharing factor between the different types of measurements is a non-integer value.

In an example of method 1000, the different types of measurements correspond to at least one of out-of-synchronization evaluations for RLM, in-synchronization evaluations for RLM, beam failure detection (BFD), candidate beam detection (CBD), radio resource measurement of neighbor cells, and measurement gap.

In an example of method 1000, determining the evaluation time period further comprises determining the first evaluation time period based on a number of measurement windows with missing reference signals. Further, the missing reference signals are due to listen before talk requirements.

In an example of method 1000, determining the evaluation time period further comprises determining the evaluation time period based on a number of reference signal prevented from transmission due to listen-before-talk requirements.

In an example, method 1000 includes determining, by the UE, whether the measurement window overlaps with one or more measurement gaps; and wherein determining the evaluation time period further comprises determining the evaluation time period based a determination that the measurement window overlaps with the one or more measurement gaps.

In an example of method 1000, the plurality of reference signals correspond to at least one of discovery reference signals (DRS), synchronization signal blocks (SSB), and channel state information reference signals (CSI-RS).

In an example of method 1000, the one or more measurement windows correspond to one or more discovery measurement timing configuration (DMTC) windows.

At 1004, method 1000 includes determining, by the UE, whether one or more of the plurality of reference signals is not received. In an aspect, the UE 104 and/or the communication component 198/configuration component 240, e.g., in conjunction with controller/processor 359, which may include the memory 360, processor(s) 1112, which may include the memory 1116, modem 1140, TX processor 368, and transceiver 1102 may determine whether one or more of the plurality of reference signals is not received. As such, the UE 104 and/or the communication component 198/configuration component 240, e.g., in conjunction with controller/processor 359, which may include the memory 360, processor(s) 1112, which may include the memory 1116, modem 1140, TX processor 368, and transceiver 1102 may define a means for determining, by the UE, whether one or more of the plurality of reference signals is not received.

At 1006, method 1000 includes adjusting, by the UE, the evaluation time period based on a determination that the one or more of the plurality of reference signals is not received. In an aspect, the UE 104 and/or the communication component 198/configuration component 240, e.g., in conjunction with controller/processor 359, which may include the memory 360, processor(s) 1112, which may include the memory 1116, modem 1140, TX processor 368, and transceiver 1102 may adjust the evaluation time period based on a determination that the one or more of the plurality of reference signals is not received. As such, the UE 104 and/or the communication component 198/configuration component 240, e.g., in conjunction with controller/processor 359, which may include the memory 360, processor(s) 1112, which may include the memory 1116, modem 1140, TX processor 368, and transceiver 1102 may define a means for adjusting, by the UE, the evaluation time period based on a determination that the one or more of the plurality of reference signals is not received.

In an example of method 1000, adjusting the evaluation time period further comprises: splitting, by the UE, different types of measurements in alternate cycles; and extending, by the UE, the evaluation time period corresponding to each measurement type based on a determination of whether one or more of the plurality of reference signals corresponding to that measurement type were not received.

In an example of method 1000, adjusting the evaluation time period further comprises extending, by the UE, the evaluation time period of all measurement types based on a determination of whether one or more of the plurality of reference signals corresponding to all measurement types were not received.

In an example, method 1000 includes determining, by the UE, whether a number of missing reference signals in the one or more measurement windows within the evaluation time period exists; and adjusting, by the UE, the first evaluation time period based on a determination that the number of missing reference signals exist.

In an example, method 1000 includes generating, by the UE, an out-of-synchronization indication based on a determination that the signal quality value of one or more of the plurality of reference signals within the evaluation time period crosses the evaluation threshold; initiating, by the UE, a Radio Link Failure (RLF) procedure in response to generating the out-of-synchronization indication; and determining, by the UE, whether a subsequent signal quality value of any of the plurality of reference signals crosses the evaluation threshold during the RLF procedure.

In an example, method 1000 include generating, by the UE, an in-synchronization indication based on a determination that the subsequent signal quality value of any of the plurality of reference signals fails to cross the evaluation threshold during the RLF procedure; and ceasing, by the UE, the RLF procedure in response to generating the in-synchronization indication.

In an example, method 1000 includes proceeding, by the UE, with the RLF procedure based on a determination that the subsequent signal quality value of any of the plurality of reference signals crosses the evaluation threshold during the RLF procedure.

In an example, method 1000 includes increasing, by the UE, a beam failure detection (BFD) count value based on a determination that the signal quality value of one or more of the plurality of reference signals within the evaluation time period crosses the evaluation threshold.

In an example, method 1000 includes determining, by the UE, whether the BFD count value exceeds a count threshold; and searching, by the UE, for a new beam based on a determination that the BFD count value exceeds the count threshold.

In an example of method 1000, searching for the new beam further comprises: determining, by the UE, whether a signal strength of any of the other plurality of reference signals corresponds to one or more additional beams exceeds a beam threshold; transmitting, by the UE to a network entity, an uplink indication identifying a new candidate beam corresponding to the one or more additional beams based on a determination that the signal strength of any of the other plurality of reference signals corresponds to the one or more additional beams exceeds the beam threshold; and communicating, by the UE, using the new candidate beam in response to transmitting the uplink indication.

Figure 11:
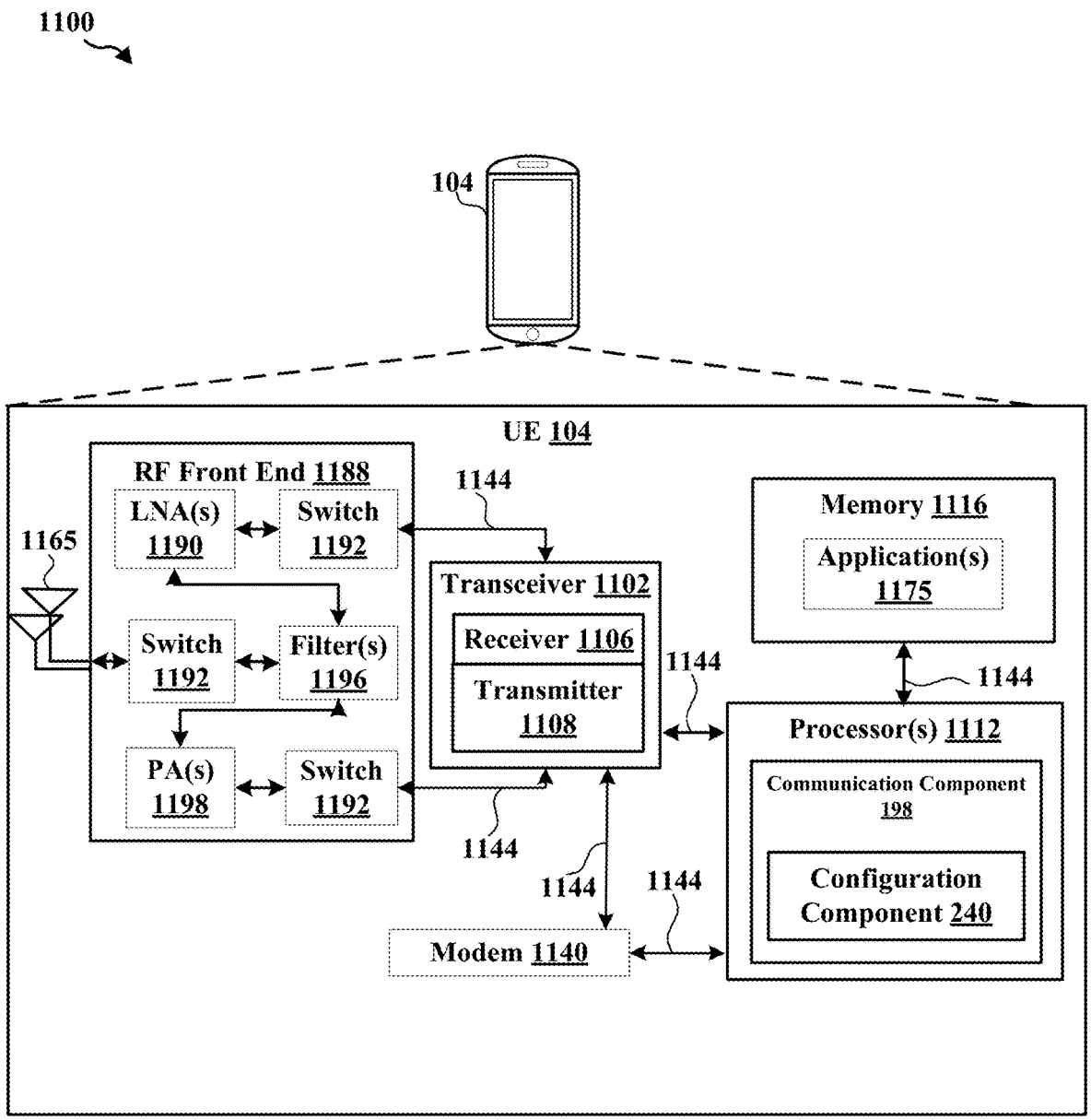
FIG. 11 is a block diagram illustrating an example of a UE, in accordance with various aspects of the present disclosure.

Referring to FIG. 11, one example of an implementation of UE 104 may include a variety of components, some of which have already been described above and are described further herein, including components such as one or more processors 1112 and memory 1116 and transceiver 1102 in communication via one or more buses 1144, which may operate in conjunction with modem 1140 and/or CC/BWP group communication component 198 for determining evaluation period(s) for beam failure detection and candidate beam detection in multi-beam NR-U.

In an aspect, the one or more processors 1112 can include a modem 1140 and/or can be part of the modem 1140 that uses one or more modem processors. Thus, the various functions related to communication component 198 may be included in modem 1140 and/or processors 1112 and, in an aspect, can be executed by a single processor, while in other aspects, different ones of the functions may be executed by a combination of two or more different processors. For example, in an aspect, the one or more processors 1112 may include any one or any combination of a modem processor, or a baseband processor, or a digital signal processor, or a transmit processor, or a receiver processor, or a transceiver processor associated with transceiver 1102. In other aspects, some of the features of the one or more processors 1112 and/or modem 1140 associated with communication component 198 may be performed by transceiver 1102.

Also, memory 1116 may be configured to store data used herein and/or local versions of applications 1175 or communicating component 1142 and/or one or more of its subcomponents being executed by at least one processor 1112. Memory 1116 can include any type of computer-readable medium usable by a computer or at least one processor 1112, such as random access memory (RAM), read only memory (ROM), tapes, magnetic discs, optical discs, volatile memory, non-volatile memory, and any combination thereof. In an aspect, for example, memory 1116 may be a non-transitory computer-readable storage medium that stores one or more computer-executable codes defining communication component 198 and/or one or more of its subcomponents, and/or data associated therewith, when UE 104 is operating at least one processor 1112 to execute communication component 198 and/or one or more of its subcomponents.

Transceiver 1102 may include at least one receiver 1106 and at least one transmitter 1108. Receiver 1106 may include hardware and/or software executable by a processor for receiving data, the code comprising instructions and being stored in a memory (e.g., computer-readable medium). Receiver 1106 may be, for example, a radio frequency (RF) receiver. In an aspect, receiver 1106 may receive signals transmitted by at least one base station 102. Additionally, receiver 1106 may process such received signals, and also may obtain measurements of the signals, such as, but not limited to, Ec/Io, signal-to-noise ratio (SNR), reference signal received power (RSRP), received signal strength indicator (RSSI), etc. Transmitter 1108 may include hardware and/or software executable by a processor for transmitting data, the code comprising instructions and being stored in a memory (e.g., computer-readable medium). A suitable example of transmitter 1108 may including, but is not limited to, an RF transmitter.

Moreover, in an aspect, UE 104 may include RF front end 1188, which may operate in communication with one or more antennas 1165 and transceiver 1102 for receiving and transmitting radio transmissions, for example, wireless communications transmitted by at least one base station 102 or wireless transmissions transmitted by UE 104. RF front end 1188 may be connected to one or more antennas 1165 and can include one or more low-noise amplifiers (LNAs) 1190, one or more switches 1192, one or more power amplifiers (PAs) 1198, and one or more filters 1196 for transmitting and receiving RF signals.

In an aspect, LNA 1190 can amplify a received signal at a desired output level. In an aspect, each LNA 1190 may have a specified minimum and maximum gain values. In an aspect, RF front end 1188 may use one or more switches 1192 to select a particular LNA 1190 and its specified gain value based on a desired gain value for a particular application.

Further, for example, one or more PA(s) 1198 may be used by RF front end 1188 to amplify a signal for an RF output at a desired output power level. In an aspect, each PA 1198 may have specified minimum and maximum gain values. In an aspect, RF front end 1188 may use one or more switches 1192 to select a particular PA 1198 and its specified gain value based on a desired gain value for a particular application.

Also, for example, one or more filters 1196 can be used by RF front end 1188 to filter a received signal to obtain an input RF signal. Similarly, in an aspect, for example, a respective filter 1196 can be used to filter an output from a respective PA 1198 to produce an output signal for transmission. In an aspect, each filter 1196 can be connected to a specific LNA 1190 and/or PA 1198. In an aspect, RF front end 1188 can use one or more switches 1192 to select a transmit or receive path using a specified filter 1196, LNA 1190, and/or PA 1198, based on a configuration as specified by transceiver 1102 and/or processor 1112.

As such, transceiver 1102 may be configured to transmit and receive wireless signals through one or more antennas 1165 via RF front end 1188. In an aspect, transceiver may be tuned to operate at specified frequencies such that UE 104 can communicate with, for example, one or more base stations 102 or one or more cells associated with one or more base stations 102. In an aspect, for example, modem 1140 can configure transceiver 1102 to operate at a specified frequency and power level based on the UE configuration of the UE 104 and the communication protocol used by modem 1140.

In an aspect, modem 1140 can be a multiband-multimode modem, which can process digital data and communicate with transceiver 1102 such that the digital data is sent and received using transceiver 1102. In an aspect, modem 1140 can be multiband and be configured to support multiple frequency bands for a specific communications protocol. In an aspect, modem 1140 can be multimode and be configured to support multiple operating networks and communications protocols. In an aspect, modem 1140 can control one or more components of UE 104 (e.g., RF front end 1188, transceiver 1102) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 1142 can optionally include mode determining component 1152. For example, upon receiving an anchor signal in an initial bandwidth portion from a network entity 102, the anchor signal triggering an initial access procedure for the UE 104, mode determining component 1152 may determine whether to operate in a wideband OFDM mode or a wideband SC-FDM mode in response to receiving the anchor signal. Communicating component 1142 may then transmit a capability report message to the network entity 102 based on the determination by the mode determining component 1152 of whether to operate in the wideband OFDM mode or the wideband SC-FDM mode In an aspect, the processor(s) 1112 may correspond to one or more of the processors described in connection with the UE in FIG. 3. Similarly, the memory 1116 may correspond to the memory described in connection with the UE in FIG. 3.

Figure 12:
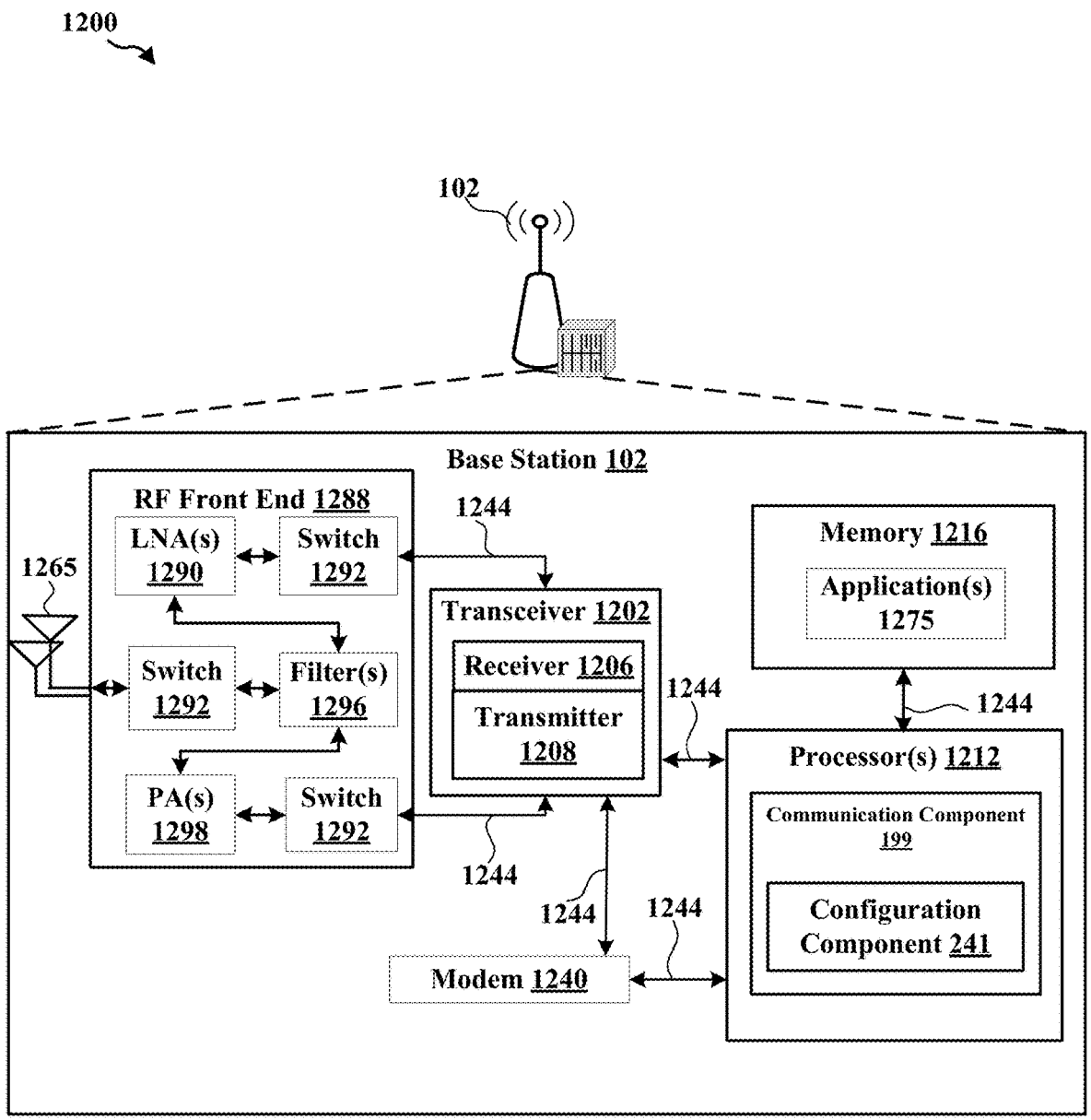
FIG. 12 is a block diagram illustrating an example of a base station, in accordance with various aspects of the present disclosure.

Referring to FIG. 12, one example of an implementation of base station 102 (e.g., a base station 102, as described above) may include a variety of components, some of which have already been described above, but including components such as one or more processors 1212 and memory 1216 and transceiver 1202 in communication via one or more buses 1244, which may operate in conjunction with modem 1240 and communication component 199 for communicating reference signals.

The transceiver 1202, receiver 1206, transmitter 1208, one or more processors 1212, memory 1216, applications 1275, buses 1244, RF front end 1288, LNAs 1290, switches 1292, filters 1296, PAs 1298, and one or more antennas 1265 may be the same as or similar to the corresponding components of UE 104, as described above, but configured or otherwise programmed for base station operations as opposed to UE operations.

In an aspect, the processor(s) 1212 may correspond to one or more of the processors described in connection with the base station in FIG. 3. Similarly, the memory 1216 may correspond to the memory described in connection with the base station in FIG. 3.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of communication by a user equipment (UE), comprising:
    determining, by multiplying a first value of a number of reference signal configuration periods where a corresponding reference signal is not available by a second value of a sharing factor, an evaluation time period; and
    measuring, during the evaluation time period, a signal quality value of a plurality of reference signals received from a network node.

2. The method of claim 1, wherein the sharing factor is between different types of measurements and is a non-integer value.

3. The method of claim 1, wherein the plurality of reference signals include at least one of out-of-synchronization evaluations for radio link monitoring (RLM), in-synchronization evaluations for RLM, beam failure detection (BFD), candidate beam detection (CBD), radio resource measurement of neighbor cells, and measurement gap.

4. The method of claim 1, further comprising adjusting the evaluation time period at least in part by:
splitting different types of measurements in alternate cycles; and
extending the evaluation time period corresponding to each measurement type based on a determination of whether one or more of the plurality of reference signals corresponding to that measurement type were not received.

5. The method of claim 1, further comprising adjusting the evaluation time period at least in part by extending the evaluation time period of all measurement types based on a determination of whether one or more of the plurality of reference signals corresponding to all measurement types were not received.

6. The method of claim 1, wherein determining the evaluation time period further comprises determining the evaluation time period based on a number of reference signals prevented from transmission.

7. The method of claim 1, further comprising:
determining whether one or more of the reference signal configuration periods overlap with one or more measurement gaps; and
wherein determining the evaluation time period further comprises determining the evaluation time period based a determination that the one or more of the reference signal configuration periods overlap with the one or more measurement gaps.

8. The method of claim 1, wherein the plurality of reference signals correspond to at least one of discovery reference signals (DRS), synchronization signal blocks (SSB), and channel state information reference signals (CSI-RS).

9. The method of claim 1, wherein the reference signal configuration periods correspond to one or more discovery measurement timing configuration (DMTC) windows.

10. The method of claim 1, further comprising:
generating an out-of-synchronization indication based on a determination that the signal quality value of one or more of the plurality of reference signals within the evaluation time period crosses an evaluation threshold;
initiating a Radio Link Failure (RLF) procedure in response to generating the out-of-synchronization indication; and
determining whether a subsequent signal quality value of any of the plurality of reference signals crosses the evaluation threshold during the RLF procedure.

11. The method of claim 10, further comprising:
generating an in-synchronization indication based on a determination that the subsequent signal quality value of any of the plurality of reference signals fails to cross the evaluation threshold during the RLF procedure; and
ceasing the RLF procedure in response to generating the in-synchronization indication.

12. The method of claim 10, further comprising proceeding, by the UE, with the RLF procedure based on a determination that the subsequent signal quality value of any of the plurality of reference signals crosses the evaluation threshold during the RLF procedure.

13. The method of claim 1, further comprising increasing a beam failure detection (BFD) count value based on a determination that the signal quality value of one or more of the plurality of reference signals within the evaluation time period crosses an evaluation threshold.

14. The method of claim 13, further comprising:
determining whether the BFD count value exceeds a count threshold; and
searching for a new beam based on a determination that the BFD count value exceeds the count threshold.

15. The method of claim 14, wherein searching for the new beam further comprises:
determining whether a signal strength of any other reference signal of the plurality of reference signals corresponds to one or more additional beams exceeds a beam threshold;
transmitting, to a network entity, an uplink indication identifying a new candidate beam corresponding to the one or more additional beams based on a determination that the signal strength of any other reference signal of the plurality of reference signals corresponds to the one or more additional beams exceeds the beam threshold; and
communicating using the new candidate beam in response to transmitting the uplink indication.

16. The method of claim 1, wherein the plurality of reference signals are configured for different types of measurements.

17. An apparatus for wireless communication at a user equipment (UE), comprising:
a transceiver;
a memory configured to store instructions; and
one or more processors communicatively coupled with the transceiver and the memory, wherein the one or more processors are configured to execute the instructions to:
determine, by multiplying a first value of a number of reference signal configuration periods where a corresponding reference signal is not available by a second value of a sharing factor, an evaluation time period; and
measure, during the evaluation time period, a signal quality value of a plurality of reference signals received from a network node.

18. The apparatus of claim 17, wherein the sharing factor between different types of measurements and is a non-integer value.

19. The apparatus of claim 17, wherein the plurality of reference signals include at least one of out-of-synchronization evaluations for RLM, in-synchronization evaluations for RLM, beam failure detection (BFD), candidate beam detection (CBD), radio resource measurement of neighbor cells, and measurement gap.

20. The apparatus of claim 17, wherein the one or more processors are configured to adjust the evaluation time period at least in part by:
splitting different types of measurements in alternate cycles; and
extending the evaluation time period corresponding to each measurement type based on a determination of whether one or more of the plurality of reference signals corresponding to that measurement type were not received.

21. The apparatus of claim 20, wherein the one or more processors are configured to adjust the evaluation time period at least in part by extending the evaluation time period of all measurement types based on a determination of whether one or more of the plurality of reference signals corresponding to all measurement types were not received.

22. The apparatus of claim 17, wherein the one or more processors configured to determine the evaluation time period are further configured to determine the evaluation time period based on a number of reference signal prevented from transmission.

23. The apparatus of claim 17, wherein the one or more processors are configured to:
  determine whether one or more of the reference signal configuration periods overlap with one or more measurement gaps; and
  wherein the one or more processors configured to determine the evaluation time period are further configured to determine the evaluation time period based a determination that the one or more of the reference signal configuration periods overlap with the one or more measurement gaps.

24. The apparatus of claim 17, wherein the plurality of reference signals correspond to at least one of discovery reference signals (DRS), synchronization signal blocks (SSB), and channel state information reference signals (CSI-RS).

25. The apparatus of claim 17, wherein the reference signal configuration periods correspond to one or more discovery measurement timing configuration (DMTC) windows.

26. The apparatus of claim 17, wherein the one or more processors are configured to:
  generate an out-of-synchronization indication based on a determination that the signal quality value of one or more of the plurality of reference signals within the evaluation time period crosses an evaluation threshold;
  initiate a Radio Link Failure (RLF) procedure in response to generating the out-of-synchronization indication; and
  determine whether a subsequent signal quality value of any of the plurality of reference signals crosses the evaluation threshold during the RLF procedure.

27. The apparatus of claim 17, wherein the one or more processors are configured to increase a beam failure detection (BFD) count value based on a determination that the signal quality value of one or more of the plurality of reference signals within the evaluation time period crosses an evaluation threshold.

28. The apparatus of claim 17, wherein the plurality of reference signals are configured for different types of measurements.

29. An apparatus for wireless communication at a user equipment (UE), comprising:
  means for determining, by multiplying a first value of a number of reference signal configuration periods where a corresponding reference signal is not available by a second value of a sharing factor, an evaluation time period; and
  means for measuring, during the evaluation time period, a signal quality value of a plurality of reference signals received from a network node.

30. A non-transitory computer-readable medium at a user equipment (UE), comprising code executable by one or more processors to:
  determine, by multiplying a first value of a number of reference signal configuration periods where a corresponding reference signal is not available by a second value of a sharing factor, an evaluation time period; and
  measure, during the evaluation time period, a signal quality value of a plurality of reference signals received from a network node.

* * * * *